United States Patent [19]

Preis

[11] Patent Number: 4,649,855
[45] Date of Patent: Mar. 17, 1987

[54] APPARATUS FOR COATING DRAGEES

[75] Inventor: Walter Preis, Lampertheim, Fed. Rep. of Germany

[73] Assignee: Boehringer Mannheim GmbH, Mannheim, Fed. Rep. of Germany

[21] Appl. No.: 548,851

[22] PCT Filed: Feb. 26, 1983

[86] PCT No.: PCT/EP83/00055
§ 371 Date: Oct. 6, 1983
§ 102(e) Date: Oct. 6, 1983

[87] PCT Pub. No.: WO83/03052
PCT Pub. Date: Sep. 15, 1983

[30] Foreign Application Priority Data

Mar. 5, 1982 [DE] Fed. Rep. of Germany ....... 3207869

[51] Int. Cl.<sup>4</sup> ................................................ B05C 5/00
[52] U.S. Cl. ......................................... 118/19; 118/20; 118/24
[58] Field of Search ..................... 118/19, 20, 24, 303; 34/130, 138

[56] References Cited

U.S. PATENT DOCUMENTS 3,357,398 12/1967 Gross .................................. 118/20 X
3,834,347 9/1974 Motoyama et al. .................... 118/19
3,874,092 4/1975 Huttlen ............................... 118/20 X

FOREIGN PATENT DOCUMENTS 2517494 3/1976 Fed. Rep. of Germany .
2731351 4/1978 Fed. Rep. of Germany .
2805801 8/1979 Fed. Rep. of Germany ........ 118/20

Primary Examiner—John P. McIntosh
Attorney, Agent, or Firm—Felfe & Lynch

[57] ABSTRACT

A device for coating formed bodies, like dragees, has a device for spraying the formed the formed bodies with a drageeing suspension and a suction device for sucking off air and dust while the formed bodies are in a kettle and moved therein by rotation of the kettle about a titled axis so that the drageeing material undergoes a three-dimensional rolling movement. The suction device has one or more perforated separating walls so in the kettle that, during the rotation of the kettle, running off drageeing material flows over a portion of one side thereof and air removal from the other side of the separating walls is restricted thereto. As a result, a large part of the air flows through the running off material for more effective drying and dust removal.

13 Claims, 3 Drawing Figures

APPARATUS FOR COATING DRAGEES

The present invention is concerned with a device for coating a drageeing material in the form of formed bodies, such as tablets, pellets, capsules and the like, the device comprising a kettle rotatable about an axis, a device for spraying the formed bodies with a drageeing suspension while the formed bodies are moved in the kettle and a suction device for sucking off air and drageeing dust through at least a part of the drageeing material, the axis of rotation of the kettle being tilted in such a manner that the drageeing material passes through a three-dimensional rolling movement in which the ascending material is present, on average, at a greater distance from the axis than the material running off.

Especially in the production of medicaments but, for example, also in the production of sweets, suitable base bodies, for example tablets, pellets, granulates and the like, which are hereinafter generally referred to as formed bodies, are frequently covered with a suitable, non-toxic substance, for example sugar, shellac or gum arabic, and often also coloured. At present, as coating materials there are frequently also used polymers, for example methyl cellulose or acrylic resin lacquer. The coated formed bodies are called dragees and, in the case of a very thin coating, are frequently also called film dragees or, in English literature, coated tablets.

High requirements are demanded, especially in the case of medicinal dragees. The coating applied serves, for example, to provide unpleasantly tasting medicaments with a pleasantly tasting covering. Furthermore, in many cases, by appropriate choice of the drageeing material, it is possible to control whether the dragee dissolves in the stomach, in the small intestine or only in the large intestine. Especially in the case of coated tablets, the applied covering is very thin, for example on a tablet of about 9 mm. diameter there are only applied 10 mg. of coating. It is readily apparent that, under such circumstances, the coating must be uniformly thick and smooth in order that the coating fulfills its purpose. Possible roughnesses are, in addition, not only undesirable because of the undesirable optical impression which they give but they can also lead to problems in the case of printing thereon or removing the dragees from a container.

In spite of these high requirements, the dragees are to be produced in the most economic manner possible, which has resulted in ever larger drageeing kettles. The layers of the dragees moving about in a kettle thereby became ever thicker and this gave rise to problems, on the one hand, because of the thereby increased friction of the formed bodies and, on the other hand, because such thick layers of drageeing materials are comparatively difficult simultaneously or alternatingly to spray and to dry with a current of air introduced in a suitable manner.

In order to avoid these problems, a number of proposals have already been made which essentially extend to the shape of the drageeing kettle and to the tilt of its axis of rotation, as well as to the guiding of the current of air. A good survey of the possible shapes of drageeing kettles is given in Federal Republic of Germany Patent Specification No. 27 31 351. Whereas the drying air in the case of the older drageeing kettles is frequently directed by pipes passing into the kettle on to the surface of the drageeing material and also again sucked out therefrom via pipes which also pass into the kettle so that the air only flows over the surface of the filling of drageeing material, in this publication there are also described a number of solutions to the problem in the case of which the current of air is passed through at least a part of the drageeing material. For this purpose, various shapes of immersion pipes were suggested which, for example, as so-called "dip lances", project into the drageeing material present in the drageeing kettle. The orifice region present in the drageeing material is perforated and frequently divided up into two zones which are separated from one another by a separating wall, air under pressure being fed in through one zone, whereas it is sucked off through the other zone. In the case of another shape of drageeing kettle described in Federal Republic of Germany Patent Specification No. 27 31 351, the introduction of the drying air takes place in a conventional manner via a pipe opening over the surface of the drageeing material. Sucking off is carried out through the wall of the drageeing kettle which, for this purpose, is provided with a perforation.

The present invention is especially concerned with drageeing kettles, the axis of rotation of which is tilted to the horizontal. As a rule, such kettles have a pear-, tulip- or onion-shape in cross section. They are usually mounted on one side and have, on the side opposite to the mounting, a filling opening which, during operation, can be closed by a lid. In such a kettle with an axis of rotation inclined to the horizontal, there is obtained a relatively complicated three-dimensional movement which, for example, is described in detail in an article by K. H. Bauer in "Pharmazeutische Industrie", 39, 149–156/1977. Because of the fact that, in this case, the direction of action of the gravitational force differs from that of the centrifugal force or of the frictional force emanating from the walls of the container, in such a kettle the drageeing material in its deepest lying region is, roughly following a mantle line of the drageeing kettle, transported obliquely upwards as ascending material in the direction of the rotation of the kettle. It thereby obliquely reaches a zenith from which, as descending or running off material, it flows back counter to the rotational movement of the kettle. Because of the tilt of the kettle therefore, the descending material has a movement component towards the axis of the kettle so that, on average, it is closer to the axis of kettle rotation than the ascending material. As is to be seen from the above-cited article, due to this three-dimensional rolling movement of the drageeing material, there is achieved a better mixing up and thus a more uniform coating than in the case of the use of a kettle with a horizontal axis of rotation.

For such a kettle, too, in Federal Republic of Germany Patent Specification No. 25 17 494 there has already been suggested a suction device in the case of which the air is passed through the drageeing material. For this purpose, the kettle wall is, as in the previously described case, perforated and sucking off takes place with the help of a suction pipe provided outside of the kettle, which pipe is connected with the perforated kettle wall via a suction pan close to the outer wall of the kettle.

However, this previously known device suffers from several disadvantages. Due to the fact that the air must flow through practically the maximum thickness of the drageeing material, the flow resistance and consequently the reduced pressure to be applied to the suction system is high. As has been recognised in the scope of the present invention, this is further increased due to the fact that the formed bodies present close to the wall in the region of the sucking off are practically stationary and adhere in dense packing on the perforations. According to the principle of the lowest resistance, the air avoids this flow hindrance and, to a considerable extent, flows over the filling of drageeing material. Furthermore, due to the perforated outer wall, the probability of damaging the formed bodies is increased and cleaning the kettle made difficult. Also constructional problems arise from the fact that the fixed pan serving for sucking off the air must be sealed off against the outer wall of the kettle.

Especially in the case of the production of coated tablets, dust in the drageeing material due to friction of the formed bodies represents a special problem. During the drageeing process, this dust adheres in an uncontrollable manner on to the formed bodies so that these get a rough surface and a non-uniform coating and the coating thus does not fulfil the above-mentioned high requirements. In order to avoid these roughnesses and non-uniformities due to friction, the formed bodies are frequently provided with a preliminary coating by pouring an appropriate coating liquid over small partial charges of a kettle filling, which coating liquid serves to bind the dust and results in a better sliding of the drageeing material in the kettle. However, this process cannot be carried out in all cases and, in addition, is also very laborious.

It is an object of the present invention to avoid the above-described disadvantages and to improve a device for the coating of drageeing material in that a more uniform and smoother coating is achieved. This is to be possible rapidly and economically in one working step and the investment costs are to be as low as possible.

Thus, according to the present invention, there is provided a device of the kind initially described in more detail wherein the suction device includes at least one perforated, separating wall which is so applied in the interior of the kettle that, during rotational movement of the kettle, the running off drageeing material flows at least partly thereover and the air take-off behind the separating wall is controlled in such a manner that any parts of the separating wall which are not in contact with the drageeing material are essentially not impinged upon by the under-pressure so that a large part of the air flows through the drageeing material running off.

To a considerable extent, the present invention is based upon the recognition of the fact that the action of the air flowing through the drageeing material is especially good not only with regard to the drying effect but especially with regard to the sucking off of disturbing dust or fines when the sucking off takes place through the material in a comparatively small layer thickness and comparatively rapidly flowing in a drageeing kettle with tilted axis. Flow over the necessary perforated separating walls is thereby relatively quick and under low pressure, the formed bodies having a relatively low packing density. Surprisingly, due to this simple measure, there is achieved a practically complete removal of fines and dust from the filling of drageeing material so that a completely smooth coating is obtained. Furthermore, by means of the device according to the present invention, an intensive drying is achieved which results in a considerable reduction of the necessary drageeing time.

The perforated separating walls are especially advantageously so arranged that a greatest possible part of the running off drageeing material flows away thereover over as broad a surface as possible and thus in low layer thickness. It is thereby of no great importance whether a part of the perforated separating walls extends, under certain operational conditions, even into the region of the ascending drageeing material which is only moving a little relative to the kettle wall but all that is important for a good effect with the smallest possible expenditure of energy (which is essentially given by the necessary amount of air and the flow resistance to be overcome) is that as large a part as possible of the air conveyed from the suction device passes through as large a part as possible of the drageeing material running off relatively near to the axis of the drageeing kettle.

Especially preferably, therefore, the perforated separating walls are mounted near to the drum axis, especially in the form of a truncated cone non-rotatable with regard to the drum. They thereby rotate with the drum counter to the running off material and, due to the resulting high relative speed, the effectiveness of the device according to the present invention is further increased.

Especially preferred in conjunction with the device according to the present invention for the spraying of the formed bodies with the drageeing suspension, there is used an immersion pipe such as is described in Federal Republic of Germany Patent Specification No. 20 29 839. By means of this immersion pipe, the spray stream with a current of air surrounding it is directed into the mass of formed bodies, it preferably being deflected in the main direction of movement of the formed bodies. In the case of the combined use of an immersion pipe with the device according to the present invention, there is possible an especially rapid and uniform drageeing with a low expenditure of energy.

Further important constructional measures according to the present invention and the advantages thereby achieved are to be seen from the following description of an embodiment of the device according to the present invention, with reference to the accompanying drawings, in which.

Figure 1:
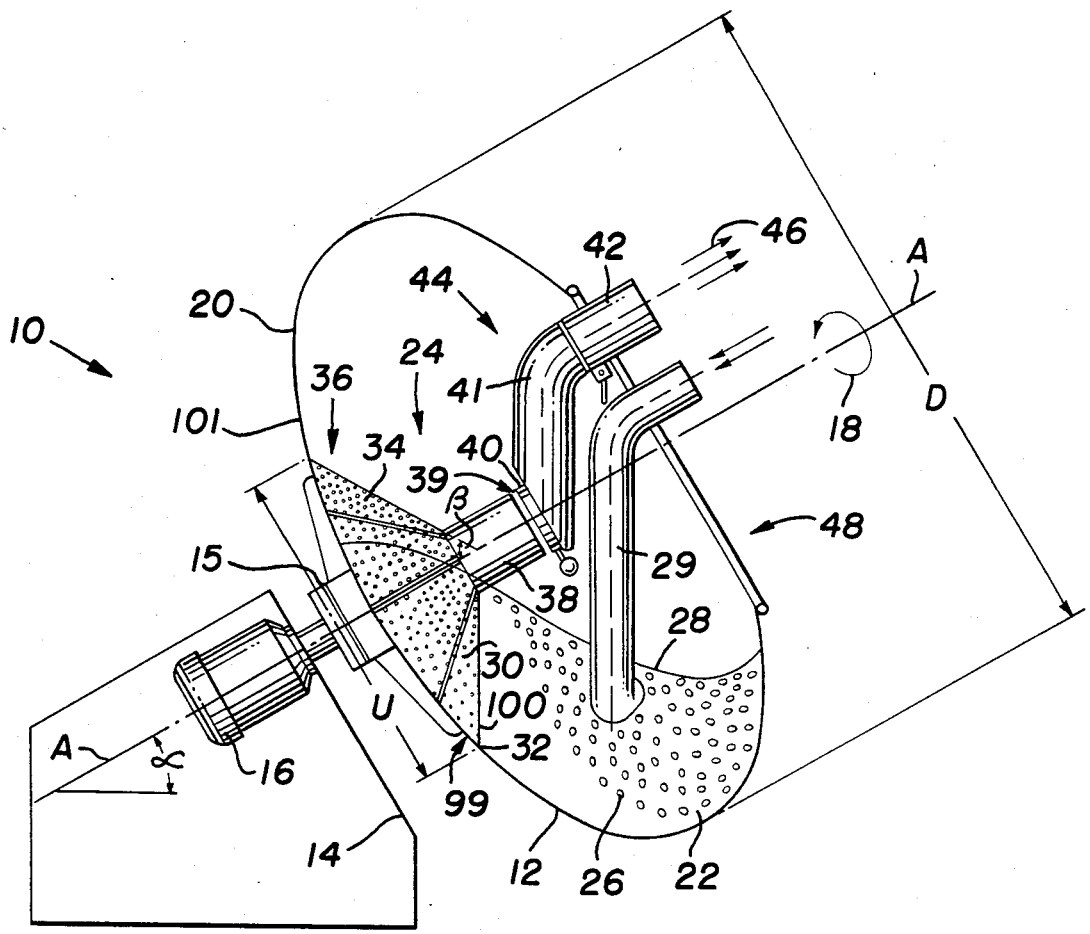
FIG. 1 is a side view, partly in section, of a drageeing device according to the present invention.

In FIG. 1, a drageeing device indicated in its totality with the reference 10, the main part of which is an onion-shaped kettle 12 which is connected via a flange 15 with a drive 16 which, in the usual way, can comprise an electric motor and a gear. The one-sided mounting is indicated by 14. In operation, the kettle rotates in the direction of the arrow 18 around the axis A which is tilted at an angle $\alpha$ to the horizontal and which, in the illustrated embodiment, is 30°.

The wall 20 of the drageeing kettle 12 is illustrated in section so that in the interior thereof there can be seen drageeing material 22 and a suction device indicated in its totality by the reference 24. The drageeing material 22 consists of a plurality of only schematically indicated formed bodies 26 which are provided with a coating during the drageeing process. For this purpose, an immersion pipe 29 is provided which is merely indicated schematically. Details of its manner of functioning are to be found in Federal Republic of Germany Patent Specification No. 20 29 839. Reference 28 indicates the bounding line of the drageeing material in the illustrated side view during movement of the kettle.

The suction device 24 comprises separating walls 30 which, in the illustrated embodiment, are arranged conically about the axis of rotation. Instead of several smooth-surfaced separating walls 30 connected with one another, the cone in the case of the illustrated construction can advantageously be produced from one piece of perforated metal sheet so that only one weld is necessary on the whole of its circumference. The perforation must be so made that, on the kettle side, there are no sharp edges which could damage the formed bodies 26. The appropriate dimensioning of the holes 34 in the perforated separating walls 30 can be determined empirically. The perforated separating walls can also be constructed like a sieve, for example from the overcrossing positioning of wires.

The lower circumference 32 of the cone 36 of perforated separating walls 30 preferably runs in the form of a circle around the axis A and is firmly attached at 99 to the kettle wall 20 so that the separating walls 30 are non-rotatably attached to the kettle 12 for rotation therewith. As a result, at least one separating wall 100 of the separating walls 30 extends at all times from the inside of the kettle wall 20 on the lower side 101 of the kettle and below the axis A of kettle rotation toward the axis A of kettle rotation.

The truncated cone 36 of the perforated separating walls 30 passes over on its upper end into a pipe 38 coaxial with the axis A and firmly and tightly bound therewith, through which pipe 38 air can be sucked off. On to the pipe 38 there is connected, via an orifice 40, a suction pipe 44 consisting, in the illustrated embodiment, of two parts 41 and 42, which, in non-illustrated manner, is fixedly mounted and leads to an appropriate, non-illustrated air conveying device, for example an average pressure ventilator, through which the air is sucked in in the way indicated by the arrows 46. In the case of the illustrated preferred embodiment, the suction pipe runs through filling opening 48 of the kettle 12, which is often closed by a non-illustrated lid, which is provided with a corresponding notch for the suction pipe 44 and is also fixedly mounted, i.e. it does not rotate with the kettle.

It is of importance for the present invention that the air removal behind the perforated separating walls 30 is controlled in such a manner that only the parts of the separating walls which, at a given point of time, are in contact with the drageeing material 22 are impinged upon by under-pressure, i.e. that sucking off can only take place through these parts of the perforated separating walls 30.

Figure 2:
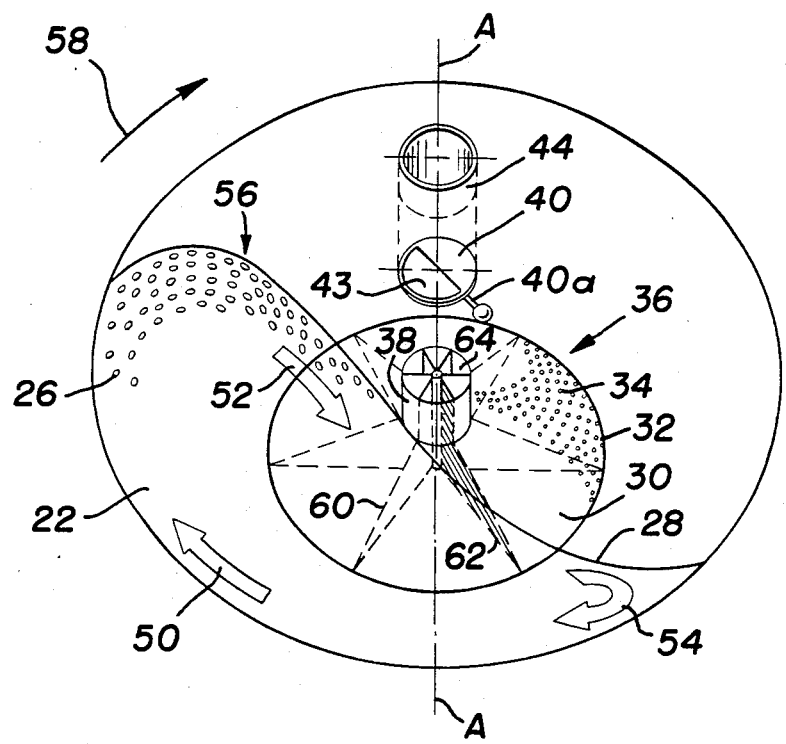
FIG. 2 is a highly schematic front view of a drageeing device according to the present invention for clarification of the mode of operation.

This is illustrated in more detail in FIG. 2 from which is also to be seen, in a schematic manner, the typical course of the movement of the drageeing material. FIG. 2 shows, in a schematic perspective illustration, the truncated cone 36 of the separating walls 30 with the pipe 38 fixed thereon. Thereabove can be seen, in exploded view, the orifice 40, adjustable by means of a handle 40a, which orifice 40 is connected to the suction pipe 44. The axis A of the kettle 12, which is only illustrated schematically in section, runs, in this illustration, obliquely from the plane of the drawing in such a manner that its projection is vertical to the plane of the drawing.

The arrows 50, 52 and 54 indicate the three-dimensional rolling movement of the drageeing material 22 typical for a drageeing kettle with a tilted axis. The arrow 50 marks the ascending material which, essentially following a mantle line of the kettle 12, is conveyed upwardly by the frictional forces between the drageeing material 22 and the kettle wall 20, until it reaches a zenith indicated by the arrow 56, at which the gravitational force is greater than the frictional forces acting upon the drageeing material, the result of which is that the drageeing material flows downwardly as running off material indicated by arrow 52. As is to be gathered from the previously cited article by K. H. Bauer, the layer thickness of the running off material at 52 is considerably smaller than that of the ascending material at 50. The immersion pipe 29 dips substantially into the running off material 52, whereby, from the openings thereof, which cannot be seen in the Figure, drageeing suspension and air are blown into the drageeing material 22 in the manner described in Federal Republic of Germany Patent Specification No. 20 29 839.

Furthermore, it is indicated in FIG. 2 that the running off material, in the case of the movement of the kettle 12 in the direction of the arrow 58, because of the tilted position of the axis A, has a component to the kettle axis A and, therefore, is present closer to the axis A than the ascending material. If, now, as in the illustrated preferred embodiment, the perforated separating walls 30 are arranged in the region of the axis A, the running off material 52 flows thereover to a considerable extent. Since the separating walls 30 are preferably non-rotatably fixed to the kettle 12, they rotate counter to the running off material 52, the relative speed between the running off material 52 and the separating walls 30 thereby being additionally increased. The sucking off thereby takes place through drageeing material 22 moving very quickly relative to the perforation 34 in a relatively small layer thickness and with a loose packing. This results in an especially effective drying of the dragees and, at the same time, a clogging of the dragees on to the perforated separating walls 30 is avoided and the energy requirement is considerably reduced because the necessary amounts of air and pressure differences are reduced in comparison with the previously known devices.

The control according to the invention of the removal of air behind the separating walls 30 takes place, in the case of the illustrated preferred embodiment, in that behind the perforated separating walls 30, i.e. on the side thereof remote from the drageeing material 22, there are provided barrier walls 62 extending parallel to the axis of rotation A which walls 62 surround this axis of rotation in the form of a star and are non-rotatably fixed to the kettle 12 so that they rotate therewith. The barrier walls 62 are exactly adapted not only to the bottom of the kettle but also to the mantle surface of the cone 36 of the separating walls 30. In this way, they form suction chambers 60 which are sealed off from one another.

The barrier walls 62 and thus also the suction chambers 60 extend into the pipe 38. On the openings 64 of the chambers 60 is connected the adjustable orifice 40 which is only separated by a very small slit 39 of, for example, 2 mm. breadth (cf. FIG. 1). This is followed, in the previously described manner, by the suction pipe 44 and the suction plant, consisting of filters and a ventilator.

By means of this preferred construction, it is achieved in a simple manner that air is only sucked off from a part of the separating walls 30 which, during the rotational movement of the kettle 12, are covered by the drageeing material 22. The size of this region can easily be varied by appropriate shaping of the opening 43 of the orifice 40 and by the number and size of the chambers 60. By rotation of the orifice 40, the impingement of the suction chambers 60 can be additionally adjusted, corresponding to the conditions. Of course, there is also a number of other possible constructions for the control of the air removal behind the perforated separating walls 30. In particular, behind the cone 36 a suction pan can be present which extends under those regions of the perforated separating walls 30 which are impinged against by the drageeing material 22 and especially by the running off material 52. As mentioned hereinbefore, it is thereby not harmful when parts of the perforated separating walls 30 are present in a region which is in part also covered by ascending material. It is important that the air flow in such cases takes place to a preponderant extent of at least about one half and preferably of at least three quarters through the running off material 52.

The dimensioning and shaping of the kettle 12, the tilt of the axis of rotation and the filling amount of the drageeing material 22 are preferably so adapted to one another that the drageeing material 22 runs through, during the movement of the kettle 12, as illustrated in FIG. 2, below the axis A, i.e. the axis of rotation does not, in this case, run through the drageeing material. There is thus obtained an especially smooth run of the drageeing material transport in the kettle 12.

The axis of rotation of the kettle is preferably tilted at an angle α of 20° to 40° to the horizontal. The angle β indicated in FIG. 1 between the mantle of the truncated cone 36 and the axis of rotation A is relatively non-critical. Angles β of between 60° and 75° have proved to be especially preferable but constructions are also possible in which the cone is degenerated to a flat disc (β=90°) or, at the other extreme, to a cylindrical continuation of the pipe 38 (β=0°).

The diameter U of the circumference 32 of the truncated cone 36 is preferably about 35 to 60% of the drum diameter D in order to bring about an optimum action of the sucking off air. Insofar as the perforated separating walls 30 are not of truncated conical shape, the region of action of the air sucking off should preferably extend correspondingly far into the drageeing material filling 22.

The illustrated prreferred embodiment has an extremely simple construction and thus favourable investment costs. In particular, between the rotating truncated cone 36 or the pipe connected therewith and the orifice 40, an expensive sealing is not necessary. The air removal takes place through the kettle opening which is in any case present so that here, too, movable sealing elements are not necessary. The illustrated kettle is, in all, constructed with a smooth surface so that, in contradistinction to the previously known drageeing kettles with perforated wall, it can easily be cleaned. The truncated cone 36 formed from the separating walls 30 is preferably so incorporated that it can easily be removed and thus can be thoroughly cleaned from both sides. Finally, the illustrated preferred construction permits a subsequent equipping of already available drageeing kettles to give a device according to the present invention.

The truncated conical construction of the perforated separating walls 30 or of a similar smooth-surfaced other construction has, in addition, the advantage that it does not inhibit the course of the formed bodies and, on the other hand, contributes to an extremely effective mixing up of the drageeing material 22, whereas, in the case of the previously known devices, precisely at this point, as is known to the expert, in the case of sugar drageeing freshly sprayed formed bodies readily remain sticking to the wall of the kettle.

Figure 3:
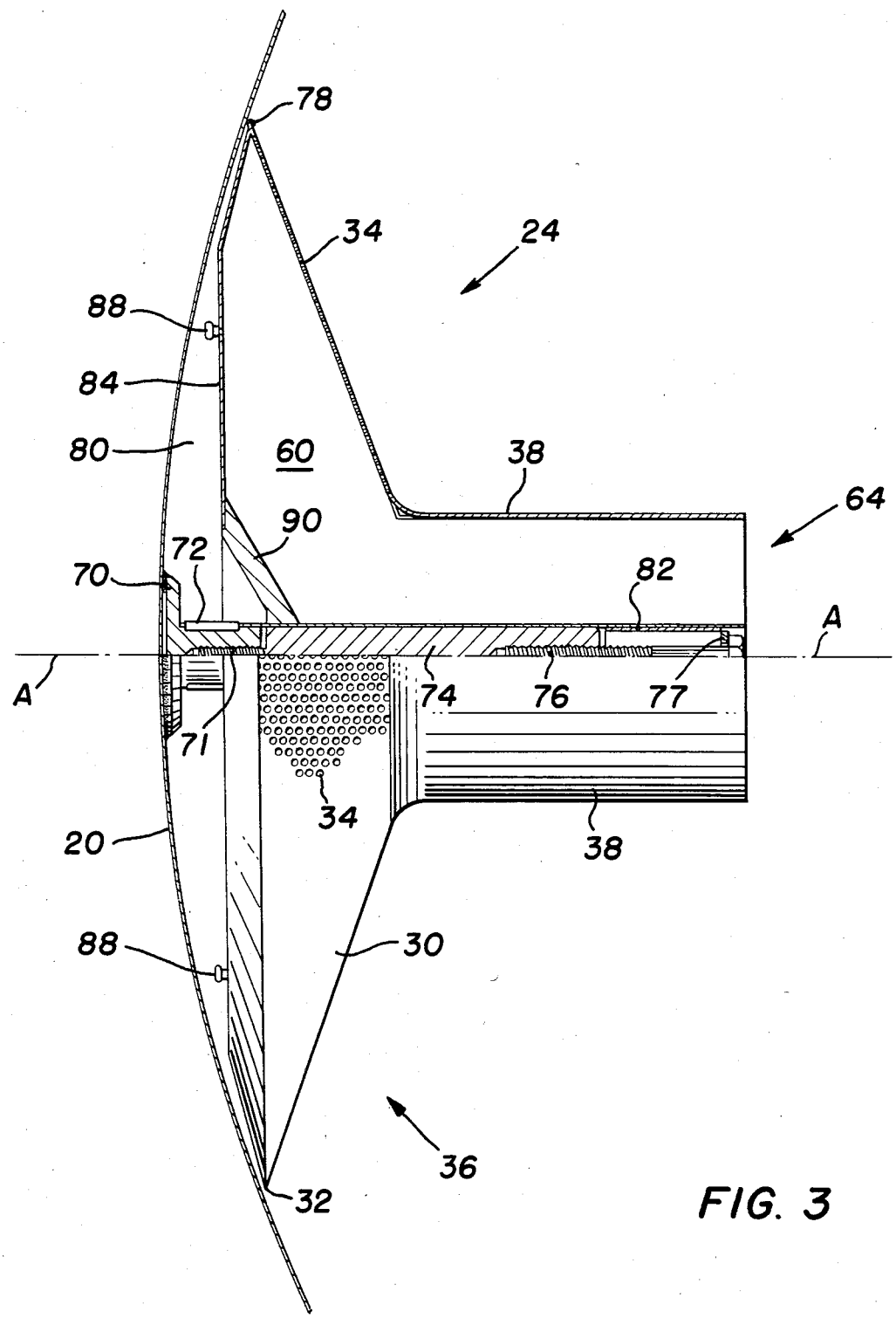
FIG. 3 is a preferred embodiment of a suction device.

FIG. 3 shows an especially preferred embodiment of a suction device 24. The kettle wall is hereby shown in section, the other parts in the upper half of the Figure in section and in the lower half in view.

In the middle of the kettle, a plug 70 is welded on to the kettle wall 20. A plug elongation 74 serves as an aid to introduction and is screwed on to the plug 70. It extends, as an elongation 74 of the plug, in the direction of the axis A.

On to the plug elongation 74 there is pushed the suction device 24 which is tightened up with a screw 76 which abuts against a flange 77 which is fixed with the pipe 82. The lower edge 32 of the truncated cone 36 is thereby sealed off by means of a seal 78 against the bottom of the kettle so that no formed bodies can get into the hollow space 80. By means of adjusting springs 72, the rotation of the kettle is transmitted to the pipe 82 which is fixedly connected via a conically shaped sheet metal baffle 90 with the sheet metal bottom 84 of the suction device 24. The conical shape of the sheet metal baffle 90 is, on the one hand, favourable for reasons of stability and, on the other hand, avoids sharp corners and angles in which largish particles could deposit which are sucked off from the drageeing material through the holes 34 which for the sake of clarity are only partly illustrated. The sealing off of the barrier chambers 60 towards the bottom of the kettle is, in the case of this embodiment, achieved by sheet metal bottom 84 which can easily be removed by means of expanded studs 88 for cleaning the side of the one-piece perforated separating wall 30 remote from the formed bodies.

The embodiment according to FIG. 3 shows especially clearly that the device according to the present invention not only has the advantages already mentioned but is also of compact construction. It is thereby, on the one hand, easy to exchange by one person or if, in certain cases, working is to be carried out in the same drageeing kettle without sucking off, it can be removed entirely and, on the other hand, the suction device according to the present invention only occupies a very small proportion of the volume of the kettle so that the filling volume thereof remains practically unchanged.

The following Example is given for the purpose of illustrating the present invention:

Example

| Drageeing drum: | |
|---|---|
| shape | onion-shaped |
| capacity | 300 kg. |
| tilt | 30° |
| speed of rotation | 18 min$^{-1}$ |
| diameter D | 1600 mm. |
| Cone: | |
| diameter U | 700 mm. |
| hole diameter of the perforation | 2.5 mm. |
| number of suction chambers | 6 |
| angle β | 60° |
| Exhaust air: | |
| amount of exhaust air | 800 m$^3$/h. |
| pressure loss (without filter and piping) | 0.0065 bar |

-continued

| Other experimental data: | |
|---|---|
| tablet charge | 1 mio pieces = 200 kg. |
| tablet diameter | 8 mm. |
| tablet hardness | 4 kp |
| spraying rate | 190 g./min. |
| period of spraying | 105 minutes. |

Course of the experiment

At the beginning of the tablet coating, some dust was only to be seen in the first 2 to 5 minutes. Subsequently, no dust was ascertainable even when the opening of the drageeing drum was not covered. The coated formed bodies thereafter had an extremely smooth and shiny surface. In comparison with a sucking off over the drageeing material, the drageeing time with the device could be reduced to a half.

I claim:

1. In a device for coating formed body material (22) having a kettle (12) rotatable around an axis (A), a device (29) for spraying the material (22) with a coating suspension while the material (22) is moved in the kettle (12) by rotation of the kettle, and a suction device (24) for sucking off air and dust through at least a part of the moving material (22), the axis of rotation (A) of the kettle (12) being tilted to the horizontal such that the material (22) undergoes a three-dimensional rolling movement in which the ascending material (22,50) is, on average, at a greater distance from the axis (A) of kettle rotation than the running off material (22,52), the improvement in that the suction device (24) comprises at least one, perforated, separating wall (30) so in the kettle (12) that, during the rotational movement of the kettle (12), running off material (52) flows over one side of the separating wall and air removal means (38,43,62,64) for applying a suction-producing underpressure to the other side of the separating wall such that any parts of the separating wall (30) not in contact with the material (22) are substantially not impinged upon by the underpressure, whereby a large part of the suction-removed air flows through the running off material (52), the separating wall having, generally, a truncated cone shape coaxially about the axis of rotation (A) of the kettle (12) with the lower circumference (U) of the truncated cone shape at an inner wall of the kettle (12) and the means for applying the suction-producing underpressure comprising a pipe (38) which is also coaxial with the axis of rotation (A) of the kettle communicating with the other, inside of the truncated cone shape of the separating wall.

2. Device according to claim 1, wherein the other, inside of the truncated cone shape of the separating wall (30) forms an angle ($\beta$) of 60° to 75° to the axis of rotation (A) of the kettle and that the diameter of the lower circumference (U) of the truncated cone shape amounts to 35 to 60% of the diameter (D) of the kettle (12).

3. In a device for coating formed body material (22) having a wall (20) defining a kettle (12) rotatable around an axis (A) tilted to the horizontal and means for spraying a coating suspension into the kettle (12) while it is being rotated around the axis (A), the improved suction device therefor comprising:

at least one, perforated, separating wall (30) extending from a lower, inside portion of the wall (20) of the kettle (12) toward the axis (A) of kettle (12) rotation with a space (80) between the separating wall (30) and the inside of the wall (20) of the kettle (12), the at least one, perforated, separating wall (30) being cone-shaped about the axis (A) of kettle (12) rotation with the largest circumference at the inside of the wall (20) of the kettle, whereby the material (22) undergoes a three-dimensional rolling movement in which the material (22,52) running off the kettle (12) is closer to the axis (A) of kettle (12) rotation than the material (22,50) ascending the kettle (12) for running over the separating wall (30) more than the ascending material (22,50); and suction device means (38) providing an underpressure to the space between the separating wall (30) and the inside of the wall of the kettle for sucking air and dust through the perforations of the separating wall, whereby air and dust are sucked through the running off material (22,52).

4. The device according to claim 3, and further comprising:

means (99) for rotating the cone-shaped separating wall (30) with the kettle (12); and control means (43,62,64) operative with the suction device means (38) for applying the underpressure substantially only to that portion of the separating wall (30) below the axis (A) of kettle (12) rotation as it rotates therebelow.

5. The device according to claim 4, wherein the suction device means (38) comprises a pipe coaxially about the axis (A) of kettle (12) rotation.

6. The device of claim 5, wherein the cone shape of the separating wall (20) forms an angle (beta) of from 60° to 75° to the axis (A) of kettle (12) rotation.

7. The device of claim 6, wherein the diameter of the cone-shaped separating wall (30) at the inside of the wall (20) of the kettle (12) is from 35% to 60% of the diameter of the kettle (12).

8. The device of claim 5, wherein the diameter of the cone-shaped separating wall (30) at the inside of the wall (20) of the kettle (12) is from 35% to 60% of the diameter of the kettle (12).

9. The device of claim 4, wherein the cone shape of the separating wall (20) forms an angle (beta) of from 60° to 75° to the axis (A) of kettle (12) rotation.

10. The device of claim 4, wherein the diameter of the cone-shaped separating wall (30) at the inside of the wall (20) of the kettle (12) is from 35% to 60% of the diameter of the kettle (12).

11. The device according to claim 3, wherein the suction device means (38) comprises a pipe coaxially about the axis (A) of kettle (12) rotation.

12. The device of claim 3, wherein the cone shape of the separating wall (20) forms an angle (beta) of from 60° to 75° to the axis (A) of kettle (12) rotation.

13. The device of claim 3, wherein the diameter of the cone-shaped separating wall (30) at the inside of the wall (20) of the kettle (12) is from 35% to 60% of the diameter of the kettle (12).

* * * * *